(12) United States Patent
Brener et al.

(10) Patent No.: US 6,597,827 B1
(45) Date of Patent: Jul. 22, 2003

(54) VOLTAGE REDUCTION IN INTEGRATED CONTROL SYSTEMS OF MIRRORS

(75) Inventors: Igal Brener, Westfield, NJ (US);
Nicolas Bonadeo, Aberdeen, NJ (US);
David Peale, Tinton Falls, NJ (US);
Shi-Sheng Lee, Middletown, NJ (US);
Ming Chou, Holmdel, NJ (US)

(73) Assignee: Tellium, Inc., Oceanport, NJ (US)

( * ) Notice: Subject to any disclaimer, the term of this patent is extended or adjusted under 35 U.S.C. 154(b) by 65 days.

(21) Appl. No.: 09/756,672

(22) Filed: Jan. 10, 2001

(51) Int. Cl.[7] .................................. G02B 6/42
(52) U.S. Cl. .................. 385/18; 385/16; 385/24; 385/17
(58) Field of Search ................ 385/18, 17, 16, 385/15, 24

(56) References Cited

U.S. PATENT DOCUMENTS

| | | | | |
|---|---|---|---|---|
| 5,080,504 A | * | 1/1992 | Partain et al. | 385/16 |
| 5,771,321 A | * | 6/1998 | Stern | 385/146 |
| 6,253,001 B1 | * | 6/2001 | Hoen | 385/16 |

* cited by examiner

Primary Examiner—Robert H. Kim
Assistant Examiner—George Wang
(74) Attorney, Agent, or Firm—Jeffery J. Brosemer

(57) ABSTRACT

An optical network element using steerable mirrors in an optical switch. A steerable mirror in the switch is connected to a potential bias having a magnitude greater than zero in order to reduce the operating potential of the integrated control system that steers the mirror.

23 Claims, 12 Drawing Sheets

VOLTAGE REDUCTION IN INTEGRATED CONTROL SYSTEMS OF MIRRORS

BACKGROUND OF THE INVENTION

1. Field of the Invention

The present invention relates to an optical fiber based communications network, and more particularly to an optical switch arrangement that provides reduced control voltages in Integrated Control Systems ("ICS") of mirrors.

2. Discussion of the Related Art

In recent years, Internet usage and other computer communications modes have become widespread. Moreover, audio and video applications that are becoming increasingly popular require large amounts of information (bandwidth) to be transferred. As a result, demands on the bandwidth supported by communications systems have skyrocketed. Optical communication systems have become increasingly important to fulfill such needs.

Such optical communications systems are capable of rapidly transferring large volumes of information by converting electrical signals into light signals and transmitting the light through optical fibers. The optical fibers form a network of optical paths between different geographic locations (e.g., different metropolitan areas). To route the information between the different locations, the information is switched between different optical paths. Conventionally, the information is switched by converting the optical signals into electrical signals, switching the electrical signals, reconverting the electrical signals to optical signals and re-transmitting the optical signals onto the desired optical path.

With advances in optical communications technology, optical switches (such as micro-mirror switches) are being developed to provide large switching fabrics that operate in the optical domain and can switch more information faster than electrical switches. Input and output coupling may be achieved by aligning an optical fiber, a collimating lens, and the mirror chip at both the inputs and the outputs.

Moreover, applications involving long distance optical paths at high bit rates (>Gbs) require the use of optical fibers requiring having tight fabrication tolerances to avoid optical loss if strict angular tolerances (within 0.01 degrees) are not achieved. In addition, such optical fibers have a small core diameter and a small numerical aperture. The small numerical aperture implies that the cone of light that can be accepted by the optical fiber is narrow. Hence, for reasons such as these, through-put is easily decreased if the light is not properly focused or if the light is diminished in intensity, thereby potentially causing signal loss or signal deterioration.

To successfully operate optical switches, the mirrors must be precisely aligned and the distance between mirrors reflecting a beam to connect fibers should be minimized. If the angular position of the steerable mirrors is off and/or if the mirrors are too far apart, some or all of the light from the input fiber will not reach the selected output fiber. The control voltages used by the Integrated Control Systems ("ICS") for steering the mirrors can be as high as 100 to 200 volts. There remains a need in the art for an optical switch having an Integrated Control System ("ICS") with lower control voltages in order to use lower voltage electronics and reduce other problems associated with high voltage switching.

SUMMARY OF THE INVENTION

Accordingly, the present invention is directed to an optical switch that substantially obviates one or more of the problems due to limitations and disadvantages of the related art.

An objective of the present invention is to provide a reduced voltage Integrated Control System for control of mirrors in an optical switching system.

Another objective of the present invention is to reduce the voltage on an integrated control system that controls mirrors in an optical switching system.

Another objective of the present invention is to reduce power consumption in the integrated control system that controls mirrors in an optical switching system by reducing the operating voltage of the integrated control system.

Additional features and advantages of the invention will be set forth in the description, which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, an optical switch includes a substrate; an array of actuation substrates positioned above the substrate; and an actuation substrate including a steerable mirror for reflecting an optical signal, wherein the steerable mirror is connected by an electrically conductive path to a potential bias having a magnitude greater than zero.

In another aspect, a method of switching optical signals includes receiving an optical signal; and using a mirror to output the received optical signal from the optical switch, wherein the mirror is connected by an electrically conductive path to a potential bias having a magnitude greater than zero.

Another aspect is an optical switch including a substrate; an array of actuation substrates positioned above the substrate; the actuation substrates including a steerable mirror for reflecting an optical signal; and trench isolation between the actuation substrates.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE PREFERRED EMBODIMENTS

Reference will now be made in detail to the preferred embodiments of the present invention, examples of which are illustrated in the accompanying drawings. Wherever possible, the same reference numbers will be used throughout the drawings to refer to the same or like parts.

Figure 1:
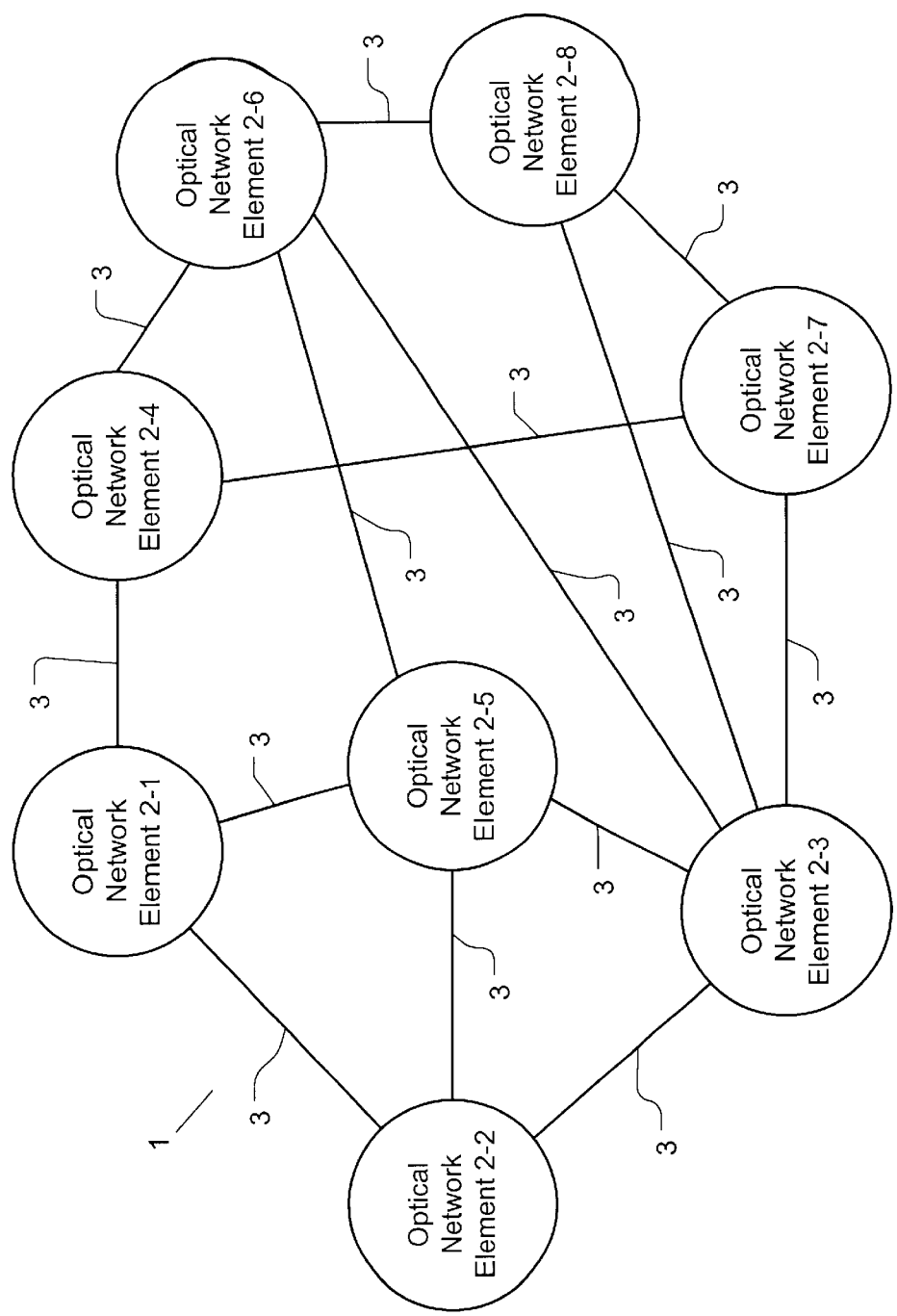
FIG. 1 illustrates an exemplary embodiment of an optical mesh communications network that includes an Integrated Control System in accordance with the present invention.

The present invention is particularly useful in optical switches for optical telecommunications network systems that carry optical communications signals, such as wavelength division multiplexed (WDM) signals, over optical fibers. FIG. 1 illustrates an exemplary embodiment of an optical mesh communications network 1. While FIG. 1 illustrates an optical mesh network, the present invention may be used in connection with other optical network architectures, such as ring, chains, and stars, among others, as well as other optical applications. As shown, the network 1 is made up of optical network elements 2-1 to 2-8 interconnected through optical links 3 in a mesh pattern. Of course, the number of optical network elements 2 and interconnections shown in FIG. 1 is intended as an example only. It should be clear that the present invention is applicable with different numbers and/or interconnections of network elements 2. The optical links 3 are shown generally and may encompass different numbers of optical paths and different physical paths between the network elements 2.

In general, the optical network elements 2 communicate information signals to other optical network elements through the optical links 3. The optical network elements 2 may include optical cross-connects, add-drop multiplexers, or other switching equipment to allow the signals carried on the optical links 3 to be transmitted through the network elements 2, as necessary, from source to destination. In addition, and not shown in FIG. 1, the optical network elements 2 may be connected to information sources (ingresses) and destinations (egresses) in the locality of that optical network element 2. Thus, information signals may enter the optical mesh network 1 at a local connection to network element 2-2. The information signals may be converted to optical signals, if they are not already, and then travel in the optical network 1 from network element 2-2, through network elements 2-3 and 2-7, and to network element 2-8, where it is passed to a destination in the locality of network element 2-8.

Figure 2:
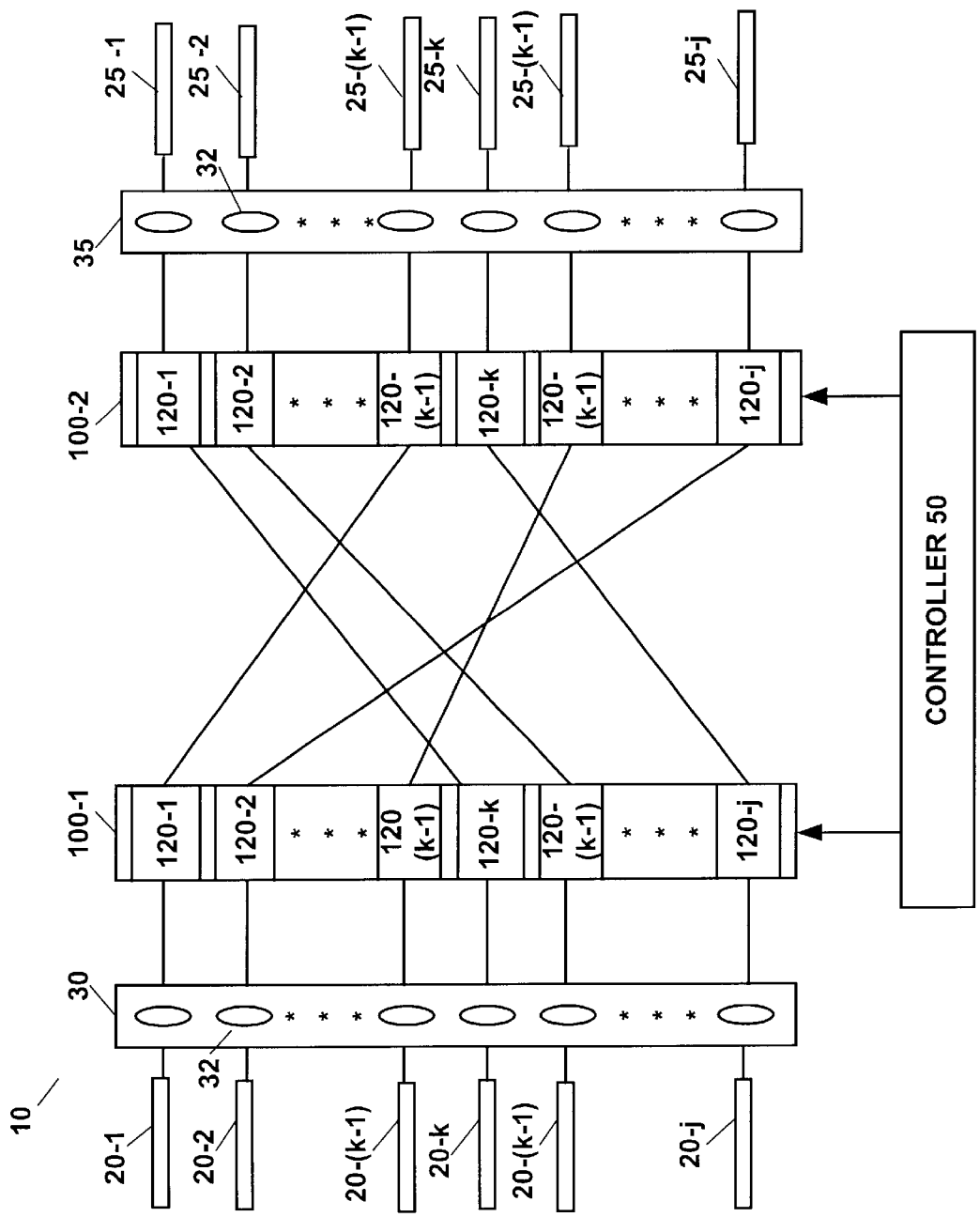
FIG. 2 provides a schematic of an illustrative optical switch design that includes mirrors in accordance with the present invention.

FIG. 2 illustrates a schematic of an optical switch 10 that may be used in network elements. The optical switch 10 according to the present invention may be configured as an optical cross connect (OXC), an add-drop multiplexer (ADM), or another optical switch arrangement.

The optical switch 10 switches optical signals from a plurality of input optical fibers 20-1 to 20-j (collectively "input optical fibers 20") to selected output fibers 25-1 to 25-j (collectively "output optical fibers 25"). The input optical fibers 20 and output optical fibers 25 may be arranged in any way, for example a k×j/k rectangular array, such as a square array. The types of the optical signals carried by the input optical fibers 20 and output optical fibers 25 do not limit the present invention. Each optical input fiber 20 may carry WDM signals, a single wavelength optical signal that was demultiplexed from a WDM signal by a wavelength division demultiplexer, or other types of optical signals, such as CATV signals. Similarly, each optical output fiber 25 may carry WDM signals, single wavelength optical signal to be multiplexed with other optical signals by a wavelength division multiplexer, or other types of optical signals. The optical signals typically carry information and may have wavelengths of about 1300–1500 nm, for example. While FIG. 2 shows a schematic of an embodiment with j input optical fibers 20 and j output optical fibers 25, the number of input optical fibers may differ from the number of output optical fibers. The input and output optical fibers might be single mode or multimode.

The input optical fibers 20 carry optical signals that are supplied, respectively, to a lens arrangement 30. The lens arrangement 30 may include a plurality of lenses 32 arranged in an array. The lenses 32 are preferably arranged so that each input optical fiber 20 is aligned with a lens 32. Alternatively, microlenses 32 may be integrated with the ends of the input optical fibers 20. In this way, optical signals emitted from an input fiber 20 will pass through one of the lenses 32. The lenses 32 direct optical beams from the input optical fibers 20 to a first arrangement of mirrors 100-1, which will be described in greater detail below. The lens arrangement 30 may also include optical detectors 33 that are aligned with the lenses 32 or have a fixed relationship therewith. The optical detectors 33 are capable of sensing optical signals. Alternatively, optical detectors 33 may be provided separately or omitted.

The first mirror arrangement 100-1 includes a plurality of steerable mirror units 120. The mirrors 122 may be arranged in a planar array or nonplanar array. Each input optical fiber 30 corresponds to one lens 32 of the first lens arrangement 30 and one mirror unit 120 of the first mirror arrangement 100-1. Using the mirror units 120 and responsive to control signals, the first mirror array 100-1 couples the optical beams from the lens array 30 to selected steerable mirror units 120 of a second array of mirrors 100-2. The second mirror array 100-2 includes mirror units 120 that may be arranged on a planar or nonplanar substrate. The second mirror array 100-2 need not match the first mirror array 100-1 in terms of being a planar array, a nonplanar array, the number of mirrors, the shape of the mirrors or the size of the mirrors.

Each mirror unit 120 of the first array 100-1 is preferably steerable to permit an input beam to be reflected by the mirror unit 120 to any mirror unit 120 of the second array 100-2. The mirror units 120 of the second array 100-2, also responsive to control signals, receive and couple the optical beams through a second lens array 35 to output fibers 25. The second lens array 35 includes lenses 32, which may be arranged in an array, aligned with output optical fibers 25. Alternatively, microlenses 32 may be integrated with the ends of the output optical fibers 25. Lenses 32 direct the optical beams into output optical fibers 25. Accordingly, optical signals carried on input optical fibers 20 may be selectively coupled to output optical fibers 25.

The mirror arrays 100-1 and 100-2 can be controlled to redirect or switch the coupling of optical signals. For example, as shown in FIG. 2, steerable mirror unit 120-1 of array 100-1 directs an optical signal to steerable mirror unit 120-(k+1) of array 100-2. However, responsive to control signals, steerable mirror unit 120-1 of array 100-1 may redirect the optical signal it receives from input optical fiber 20-1 to steerable mirror unit 120-2 of array 100-2. Mirror unit 120-2 may be controlled to receive the optical signal and provide it to optical fiber 25-2.

While FIG. 2 shows a dual stage switching arrangement, one or more additional stages of mirror arrays may be interposed between mirror arrays 100-1 and 100-2 to form a multi-stage switching arrangement. Furthermore, a mirror switching arrangement may contain two or more mirror arrays in which a mirror array nearest an input can direct the input beam to one or more other mirror arrays nearest an output. Such an arrangement can also be accomplished with a mirror switching arrangement in which mirror array(s) nearest the input are arranged on a nonplanar convex (or concave) substrate and the other mirror arrays nearest an output are on a nonplanar concave (or convex) substrate.

Figure 3:
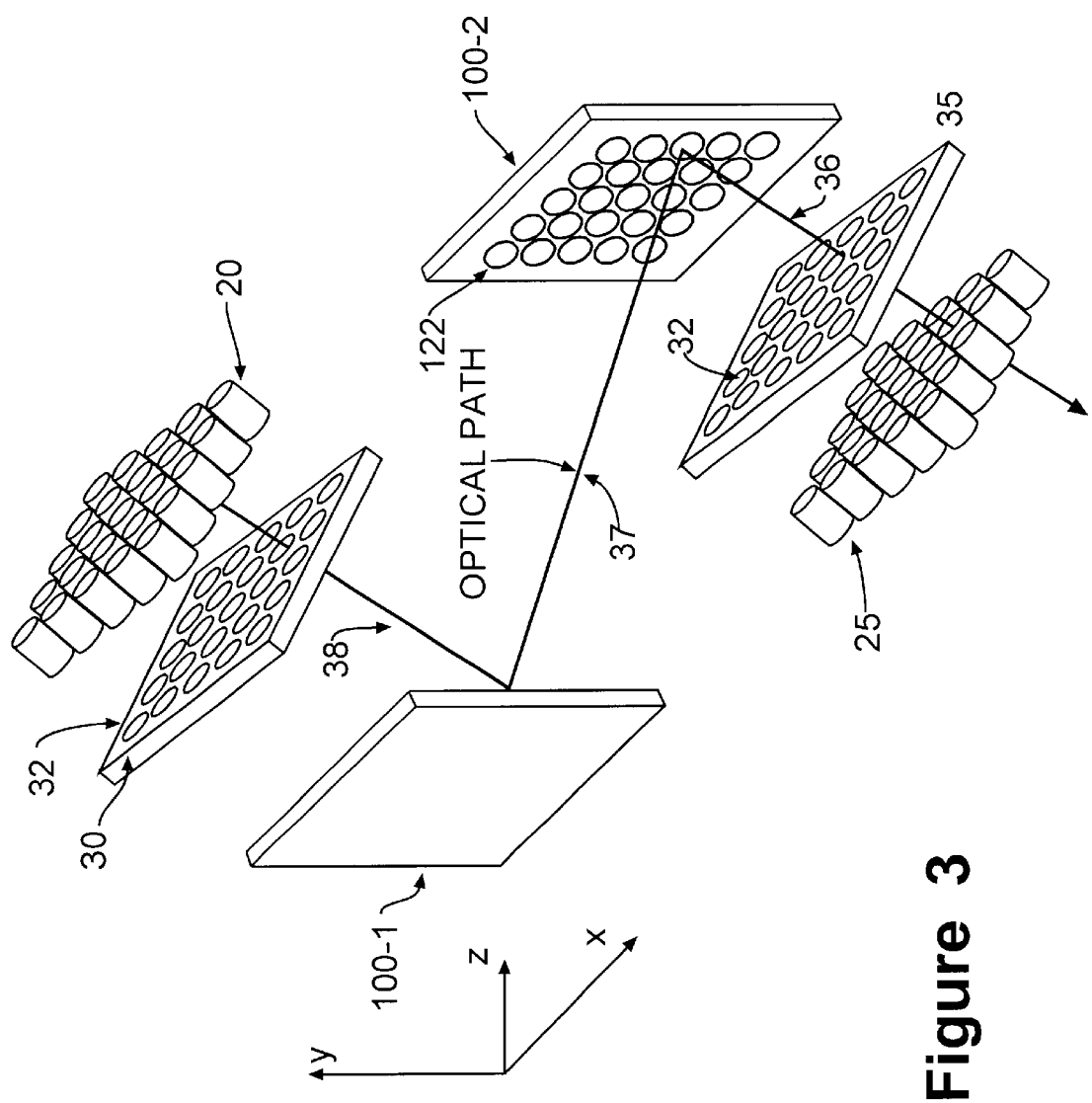
FIG. 3 illustrates an embodiment of an exemplary optical switch design using an Integrated Control System in accordance with the present invention.

FIG. 3 shows an example of an optical switch 10 according to the schematic of FIG. 2. As shown in FIG. 2, the input optical fibers 20 and the output optical fibers 25 are arranged in two-dimensional arrays. Similarly, lens arrangements 30 and 35 include lenses 32 arranged in arrays and aligned with the input optical fibers 20 and the output optical fibers 25, respectively. The lens arrangement 30, 35 also include detectors 33 aligned with the lenses 32 on the opposite sides of the substrates of the lens arrangements. The mirror units 120 of the first and second arrays 100-1, 100-2 are formed of microelectromechanical system (MEMS) elements. The first array 100-1 is positioned at an angle to lens array 30 and generally faces the second array 100-2 with a distance between the two arrays. The second array 100-2 is positioned at an angle to the second lens array 35. Accordingly, an optical path 36/37/38 from an input fiber to an output fiber traverses a generally "Z-shaped" optical path, as illustrated in FIG. 3. However, different optical path shapes may also be implement with other input/output and mirror array arrangements.

As shown in FIG. 3 with a single optical beam, the first lens array 30 receives the input optical beam from the input optical fibers 20 at a lens 32 and directs the input beam to a steerable mirror unit 120 of the first array 100-1. Depending on the angular position of the steerable mirror 122, the input optical beam is reflected to a selected steerable mirror unit 120 of the second array 100-2. The steerable mirror unit 120 of the second array 100-2 reflects the input optical beam through a lens 32 of the second lens array 35 to a selected one of the output optical fibers 25. Thus, the optical beam passes out of the input optical fiber, passes through a lens 32 of the first lens array 30, is reflected by mirrors in the first and second arrays 100-1, 100-2, passes through a lens 32 of the second lens array 30, and is directed into a selected output optical fiber 25.

Figure 4A:
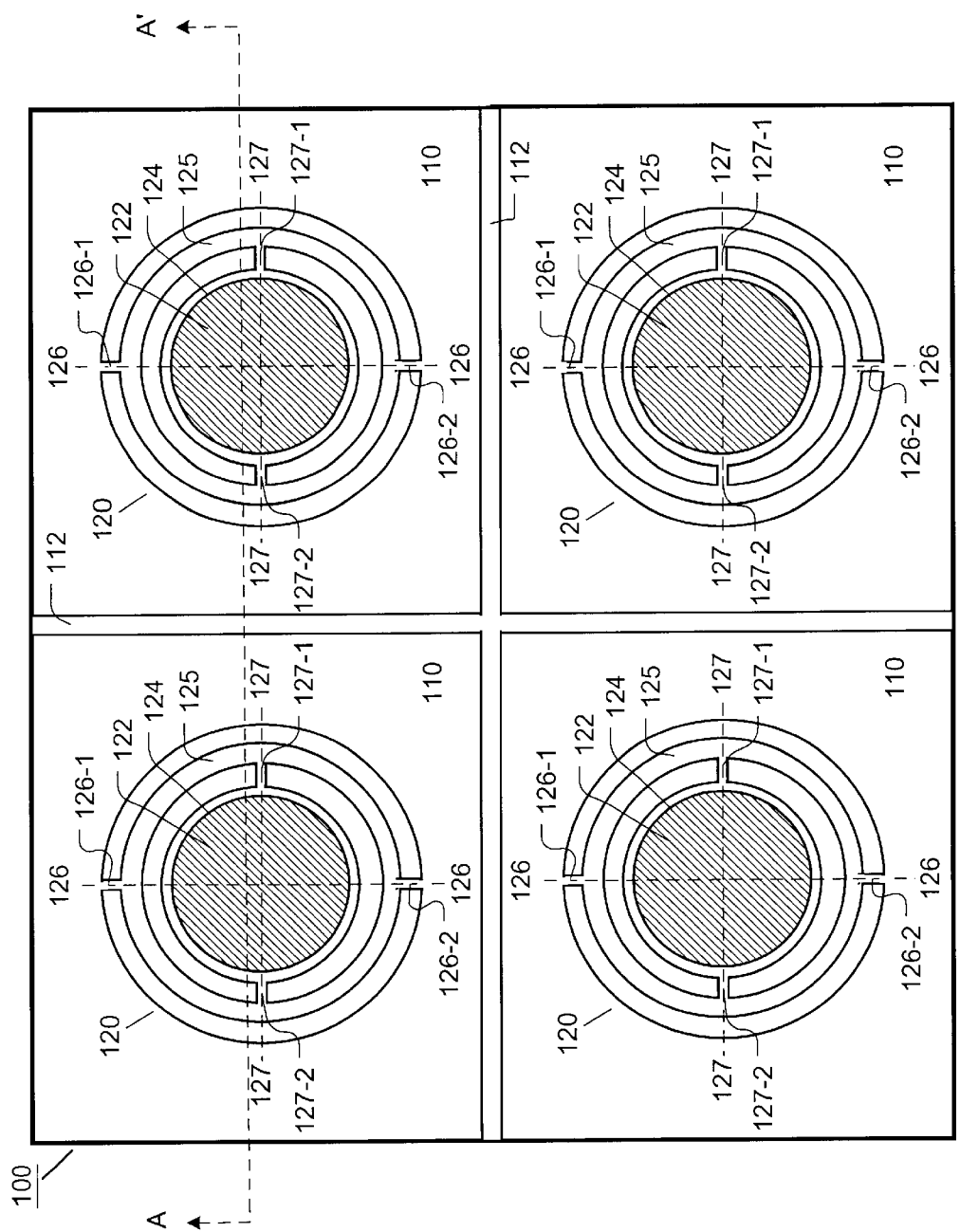
FIGS. 4a and 4b are respectively plan and cross-sectional views of an exemplary single gimbal microelectromechanical system ("MEMS") mirror that may be used in accordance with the present invention.
Figure 4B:
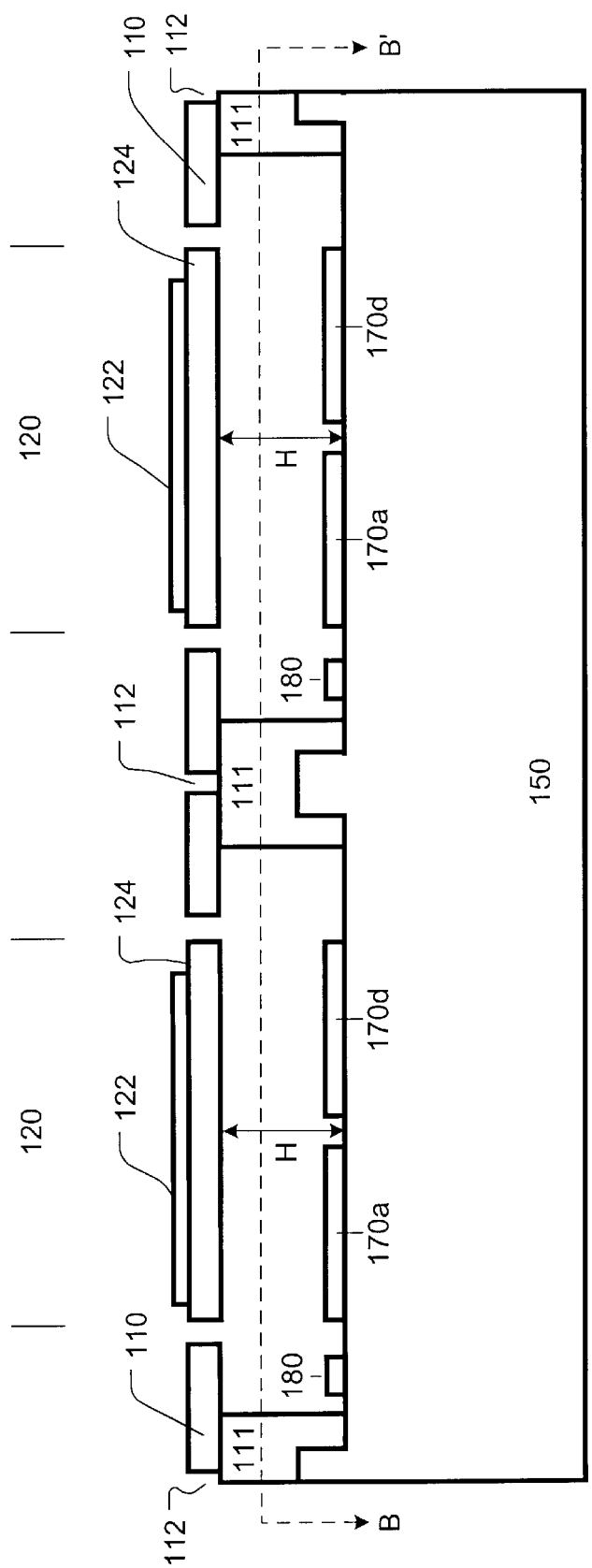

FIGS. 4a and 4b respectively illustrate plan and cross-sectional views of a portion of an exemplary mirror array 100. FIG. 4b represents a cross-section of the mirror arrangement 100 of FIG. 4a taken along an axis A–A'. As should be apparent, FIGS. 4a and 4b provide simplified illustrations of mirror arrangement 100 for purposes of explanation. Of course, other mirror or other mirror array structures may be used consistent with the present invention.

As shown in FIG. 4a, the mirror arrangement 100 may be formed using MEMS technology. The arrangement 100 includes a plurality of actuation substrates 110 in an array, which may be formed, for example, of single crystalline silicon on which a mirror unit 120 is formed. More particularly, the actuation substrate 110 includes a mirror 122 and a corresponding mirror mount 124 for mounting the mirror 122. The mirrors 122 may be formed with a gold coating, for example, to provide a reflective surface. It should be understood, however, that the mirror 122 may be formed of any material that is reflective. Preferably, the mirror is formed of a material that is both reflective and conductive. Each mirror unit 120 on its corresponding actuation substrate is isolated from other mirror units 120 by an isolation trench 112. The trench 112 can be open or filled with insulating material. FIG. 4a shows four steerable mirror units 120 for purposes of illustration. Of course, the mirror arrangement 100 may have more or fewer than four steerable mirror units 120.

In particular, the mirror mount 124 includes a mounting arm 125 coupled to the actuation substrate 110 by pivot arms 126-1, 126-2 and coupled to the mirror 122 by pivot arms 127-1, 127-2. Pivot arms 126-1 and 126-2 enable the mounting arm 125, and thus the mirror 122, to pivot with respect to the planar substrate 300 about a first axis 126. Pivot arms 127-1 and 127-2 enable the mirror 122 to pivot with respect to the mounting arm 125 about a second axis 127, which is orthogonal to the first axis 126. The pivot arms may be single crystal silicon serpentine springs or other elastic/pivoting devices. Electrostatic or electromagnetic forces on the mirror 122 from electrodes 170 on the substrate 150 below the mirror 122 cause the pivoting action. Each mirror 122 with its corresponding mirror mount 124, mounting arm 125 and pivot arms 126-1/126-2/127-1/127-2 form a steerable mirror unit 120.

As shown in FIG. 4b, the actuation substrates 110, in which each includes a mirror unit 120, are mounted on a spacer 111 that separates the substrate 150 from the actuation substrates 110. The substrate 150 can be silicon, ceramic, epoxy, polyimide or other like materials. The spacer 111 can be silicon, ceramic, epoxy, polyimide or other like materials. In addition, the spacer can be omitted and mesa-like extensions of the substrate 150 can be used to, support the actuation substrates 110. The substrate 150 includes a plurality of electrodes 170 arranged in groups corresponding to the steerable-mirror units 120 and, in particular, to the mirror 122 and mirror mount 124 of the steerable mirrors 120. Electrodes 170 act on the mirror 122 to control the angular position of the mirror 122 by electrostatic or electromagnetic force using the integrated control system 180 positioned adjacent and connected to the electrodes 170. Of course, the integrated control system can be placed elsewhere and use a multiplexer to control several mirrors. In addition to acting on the mirror 122, if the mirror mount 125 is conductive, the electrodes 170 can also act on the mirror mount 125 to control the angular position of the mirror 122 by electrostatic or electromagnetic force using the Integrated Control System 180 attached to the electrodes 170.

Figure 4C:
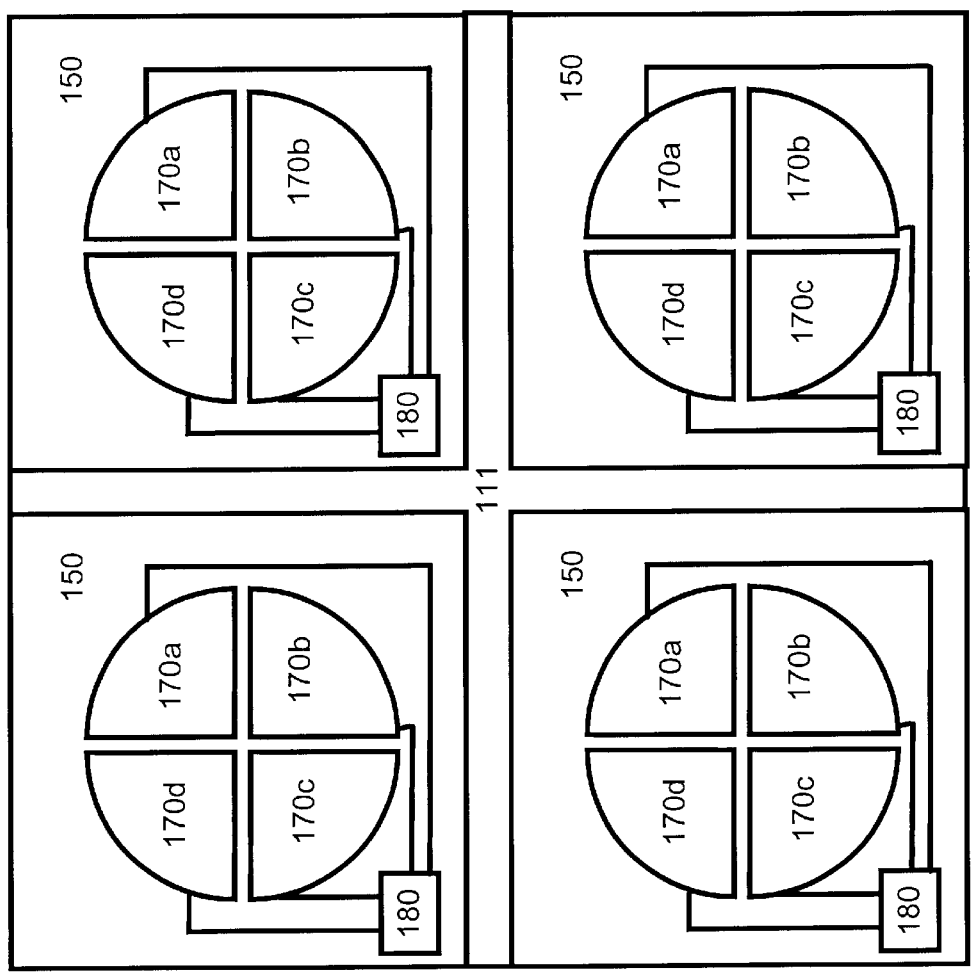
FIG. 4c shows the tilting of a MEMS mirror in FIGS. 4a and 4b.
Figure 4D:
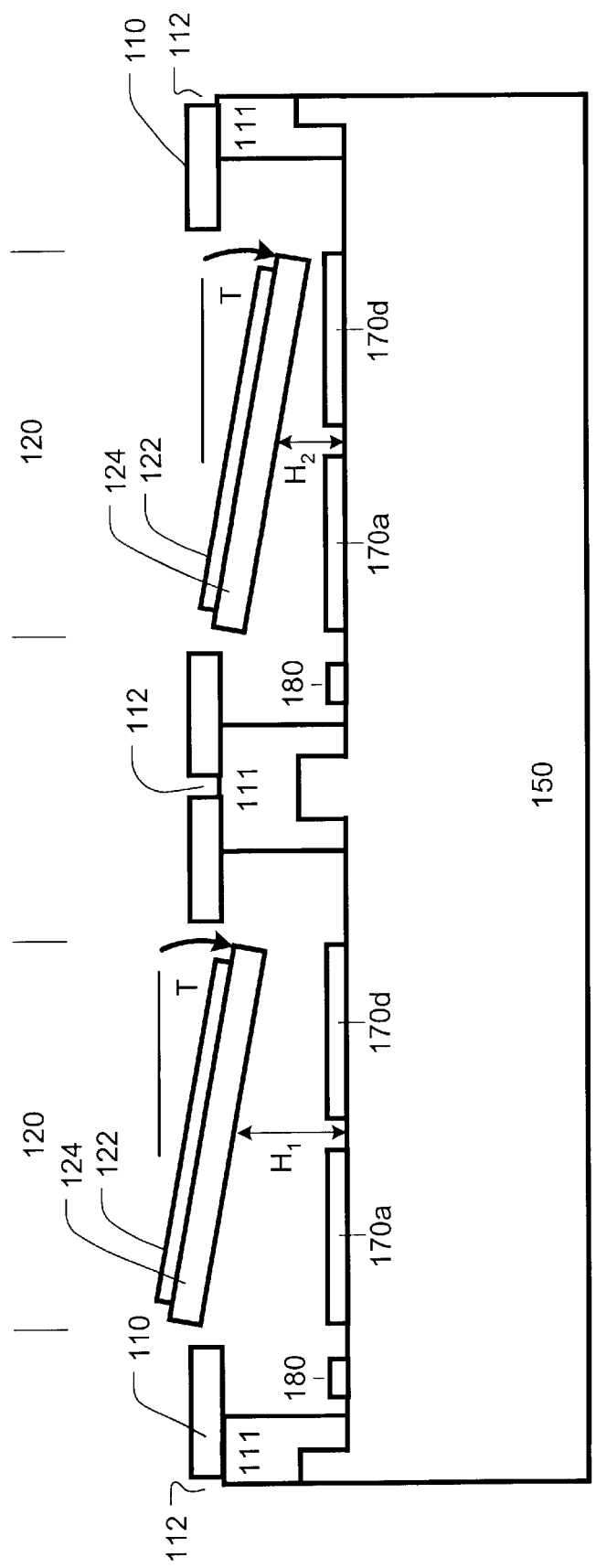
FIG. 4d is a cut-away plan-view along B–B' of FIG. 4c of an exemplary arrangement of control electrodes in a MEMS mirror system according to the present invention.

FIG. 4c illustrates an exemplary embodiment of electrodes that may be used to control the tilt of mirrors 122 in a plan view of FIG. 4b shown as B–B'. Similar to FIGS. 4a and 4b, FIG. 4c is merely an example of an electrode structure that can be used. For instance, the electrodes could all be shifted 45 degrees and thus each would be be directly under a pivot arm of the mirror. As shown in FIG. 4c, the electrodes 170a and 170b working in combination with electrodes 170c and 170d control the angular position of the mirror 122 about axis 126 shown in FIG. 4a. Electrodes 170a and 170b working in combination with electrodes 170c and 170d control the angular position of the mirror 122 about axis 127 shown in FIG. 4a. Electrodes 170a–170d are respectively connected to the integrated control system 180 with wires or traces for tilt control of the mirror 122. As further depicted in FIG. 4d, by appropriate control of electrodes 170a–170d collectively, the tilt angle of mirror 122 may be controlled, as well as, the height H (i.e. z-axis) of the mirror 122. A DC bias to all four electrodes 170a–170d can make the top surface of the mirror 122 rise slightly above $H_1$ or sink slightly below $H_2$ the top surface of the actuation substrate 110, with the direction of movement depending on the polarity of the DC biasing. Therefore, an appropriate DC potential Vt on each of the control electrodes 170 of a mirror tilts the mirror to a predetermined tilt angle position. Vt will herein be referred as the tilting potential. A DC potential Vh that is equally applied to all of the control electrodes 170 sets the height H of the mirrors to a predetermined height. Vh will herein be referred to as the height potential. The total amount of bias potential applied to each electrode 170 will herein be referred to as the Vbp for an electrode, that is the sum of the tilting potential Vt and the height potential Vh (i.e. Vt+Vh= Vbp).

Figure 5:
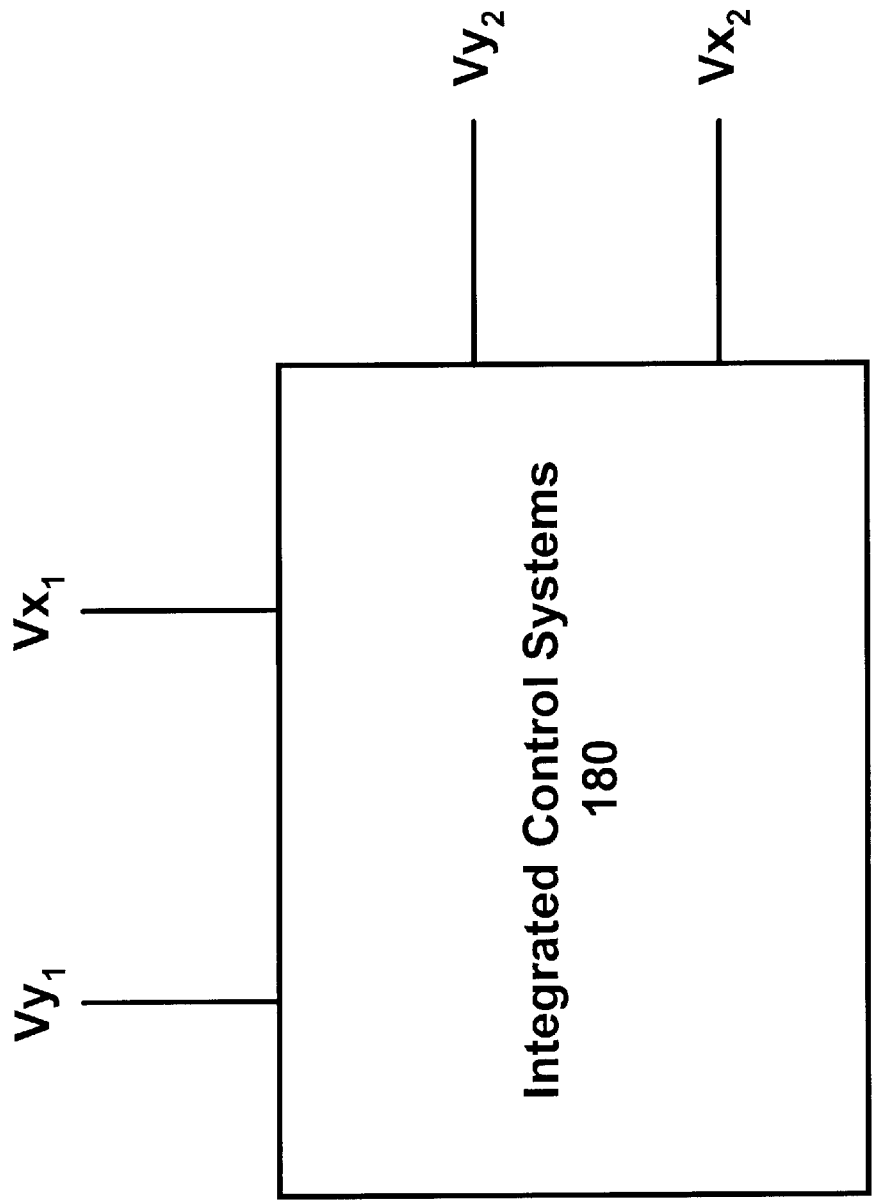
FIG. 5 is a diagram of the outputs of an Integrated Control System according to the present invention.

As shown in FIG. 5, a bias potential Vbp is applied to each of the electrodes 170. The bias potential Vbp for electrode 170a is $Vy_1$ because it controls the tilt of the mirror in a first y-direction. The bias potential Vbp for electrode 170c is $Vy_2$ because it controls the tilt of the mirror in a second y-direction. The bias potential Vbp for electrode 170d is $Vx_1$ because it controls the tilt of the mirror in a first x-direction. The bias potential Vbp for electrode 170b is $Vx_2$ because it controls the tilt of the mirror in a second x-direction.

The tilting potential Vt for each electrode 170 is applied by an Integrated Control System ("ICS") that specifically controls the tilt angle of the mirrors using logic circuits in the ICS. In addition, the ICS can also control the height of the mirror by adding a height potential Vh to each of the Vt potentials for each of the electrodes 170 for a total bias potential Vbp equal to a controlling DC potential of the tilting potential Vt plus the height potential Vh for each electrode. Therefore, the ICS can adjust the mirror with the appropriate DC biases Vbp for each electrode and steer the mirror, as well as, position the mirror at a certain height if required.

Figure 6:
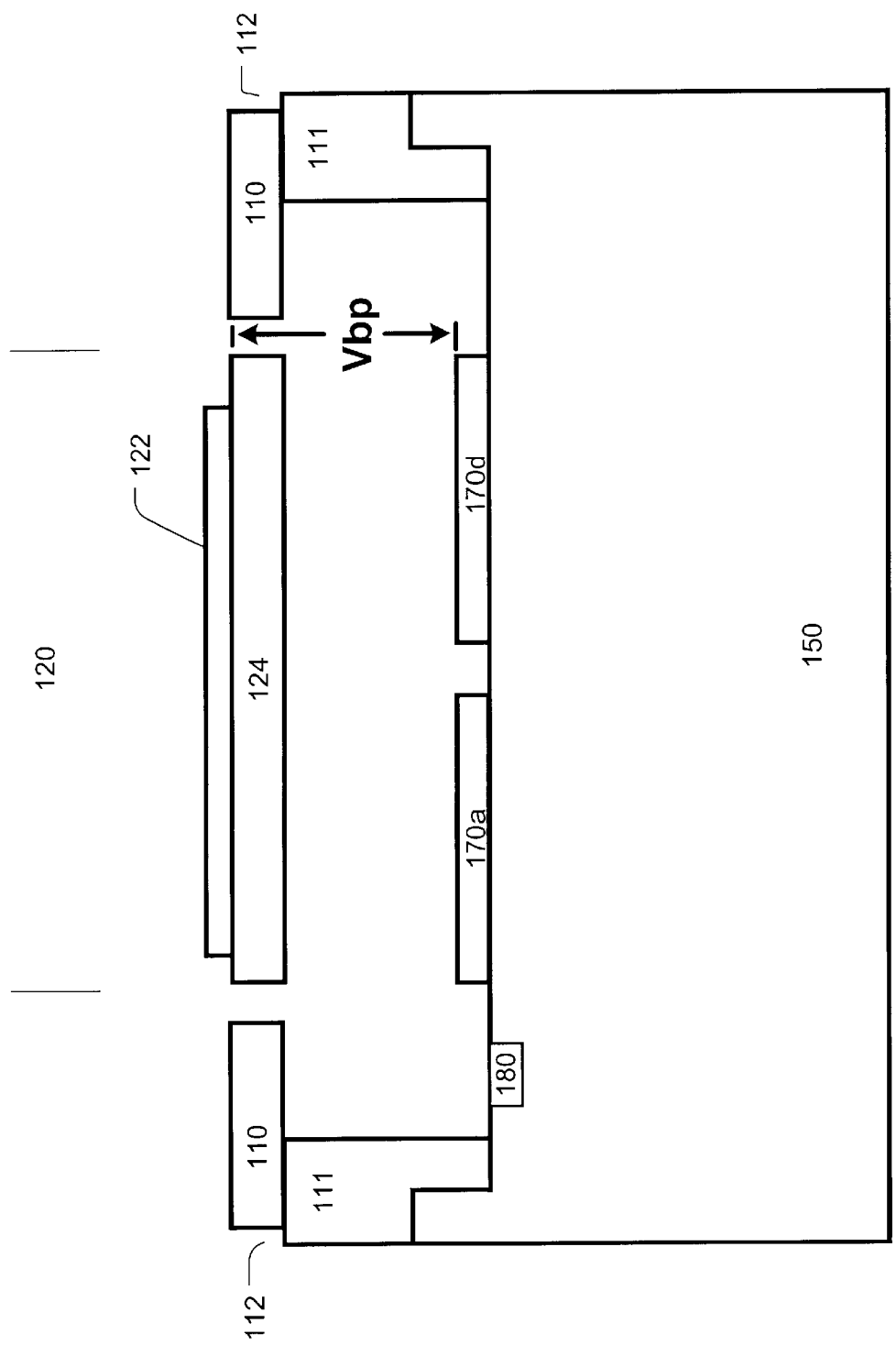
FIG. 6 illustrates the relation of the bias potential Vbh between the mirror and control electrodes of a steerable mirror according to the present invention.

As shown in FIG. 6, the potential Vbp for controlling the mirror movement is between the electrodes 170 and the mirror 122 that is floating or at a ground potential. An example of controlling a mirror will now be given that illustrates the first embodiment of the invention. The following example is not intended to limit the present invention in terms of operating potentials, but is merely exemplary in how the present invention achieves the objects of the present invention. For example, a switching situation that uses a tilting potential Vt of ±40 volts and a height potential Vh of 80 volts can be implemented using the exemplary structures shown in FIGS. 4a–4d. Of course, Vh can be varied in other switching situations. As a result of such potentials being implemented, the ICS will be controlling voltages ranging from 40 volts to 120 volts (i.e. 80±40) to be output on the electrodes 170 as $Vx_1$, $Vx_2$, $Vy_1$ and $Vy_2$. FIG. 6 also shows that the ICS 180 can be fabricated in the substrate 150 if the substrate is a semiconductor (e.g. single crystalline silicon) or an ICS chip can be placed in a well of the substrate 150.

Figure 7:
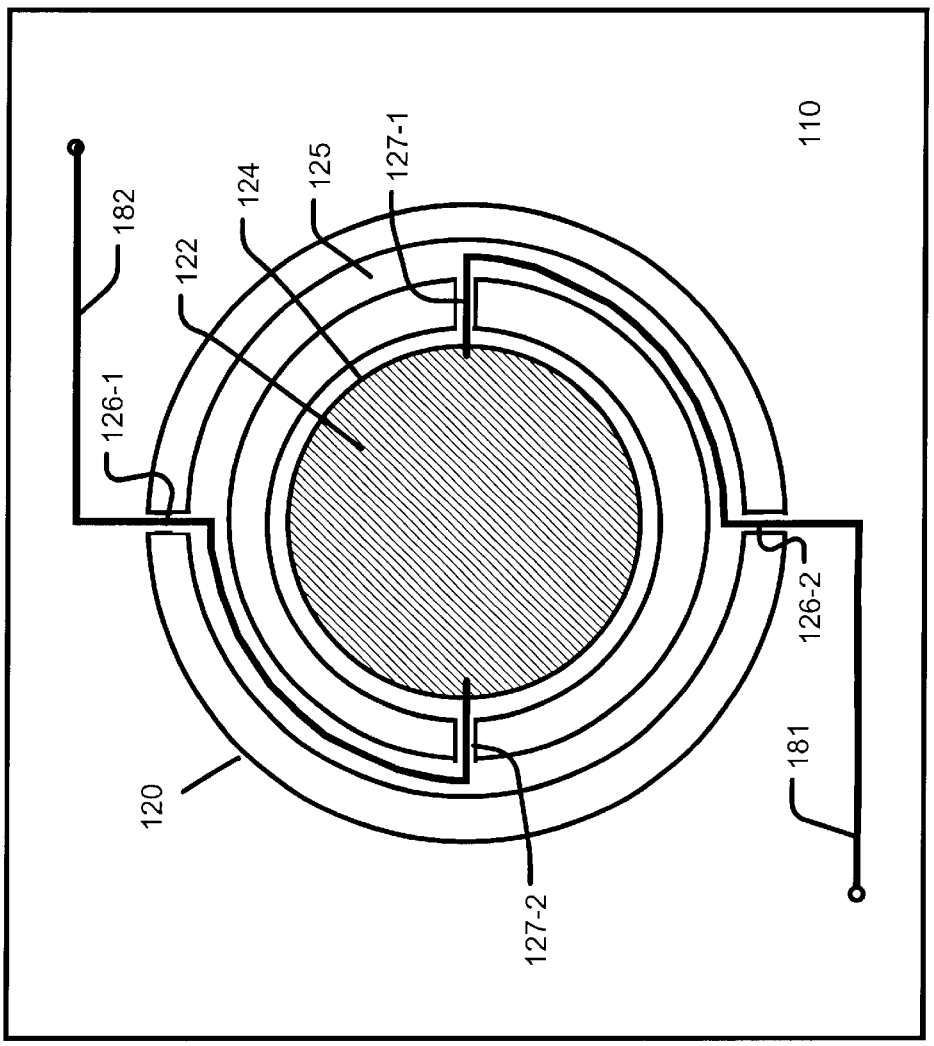
FIG. 7 illustrates an exemplary embodiment illustrating the connecting of a wire or trace to the mirror according to the present invention.

In order to use lower voltage electronics and reduce power consumption in the switching circuits of the ICS, the mirror 122 is biased at a potential equivalent to the absolute value of the system's height potential Vh, but of opposite polarity to the system's height potential Vh. In this example, the mirror is biased at a potential mV of –80 volts with a wire, trace or other conductive path 181/182, as shown in FIG. 7. As a result of the mirror bias Vm, the ICS will be controlling voltages ranging from –40 volts to 40 volts (i.e. –80+80±40=Vm+Vh+Vt) to be outputted on the electrodes 170 as $Vx_1$, $Vx_2$, $Vy_1$ and $Vy_2$. In other words, the ICS will no longer have to control with potentials greater than the absolute value of a potential required for tilting the mirror.

The mirror bias Vm does not necessarily have to be at a potential equivalent to the absolute value of the system's height potential bias Vh but can be at any potential which reduces the absolute value of the potential used by the ICS to tilt or steer the mirror. Using the above example, the mirror can be biased Vm at a potential of –40 volts, thus the ICS will be controlling voltages ranging from 0 to 80 volts (i.e. –40+80±40=Vm+Vh+Vt) to be outputted on the electrodes 170 as $Vx_1$, $Vx_2$, $Vy_1$ and $Vy_2$.

FIG. 7 shows a mirror structure like or similar to the mirrors shown in FIGS. 4a–4d but with wires 181 and 182 on the actuating substrate 110, the pivot arms 126/127, mounting arm 125 and the mirror mount 124. The wires are connected to the mirror 122 and provide the bias potential Vm to the mirror 122. Specifically, the wire 181 on top of the actuating substrate 110 runs across the pivot arm 126-2, down the mounting arm 125 to the pivot arm 127-1, and then across the pivot arm 127-1 and the mirror mount 124 to connect to the mirror 122. Wire 182 on top of the actuating substrate 110 runs across the pivot arm 126-1, down the mounting arm 125 to the pivot point 127-2, and then across the pivot arm 127-2 and the mirror mount 124 to connect to the mirror 122.

Figure 8:
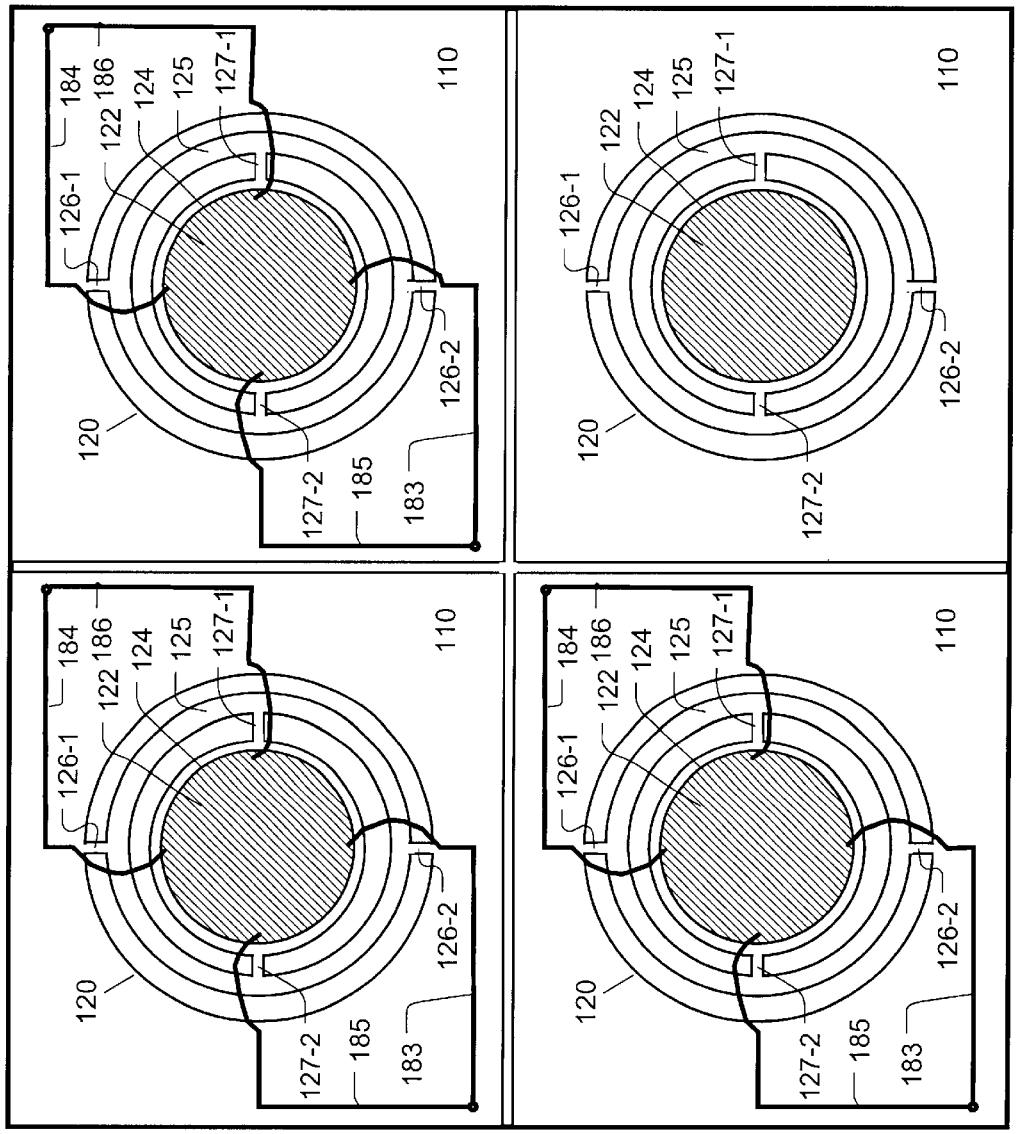
FIG. 8 illustrates an exemplary embodiment illustrating the connecting of a wire to the mirror with an air bridge connection.

Although two wires are shown in FIG. 7 for symmetry and balance of the mirror assembly 120, only one wire is necessary to bias the mirror 122. Not only can one wire be used, but also more than two wires can be used and the wires can jump across from the actuating substrate 110 to the mirror 122. FIG. 8 shows a second embodiment of the present invention, in which wires 183–186 make an air-bridge connection with the mirror 122 in that they jump across the pivot arms from the actuating substrate directly to the mirror 122. Furthermore, FIG. 8 shows that every mirror unit 120 in an array does not necessarily have to be biased if the operating potentials of the ICS do not warrant the need for providing a potential bias Vm to the mirror.

Figure 9:
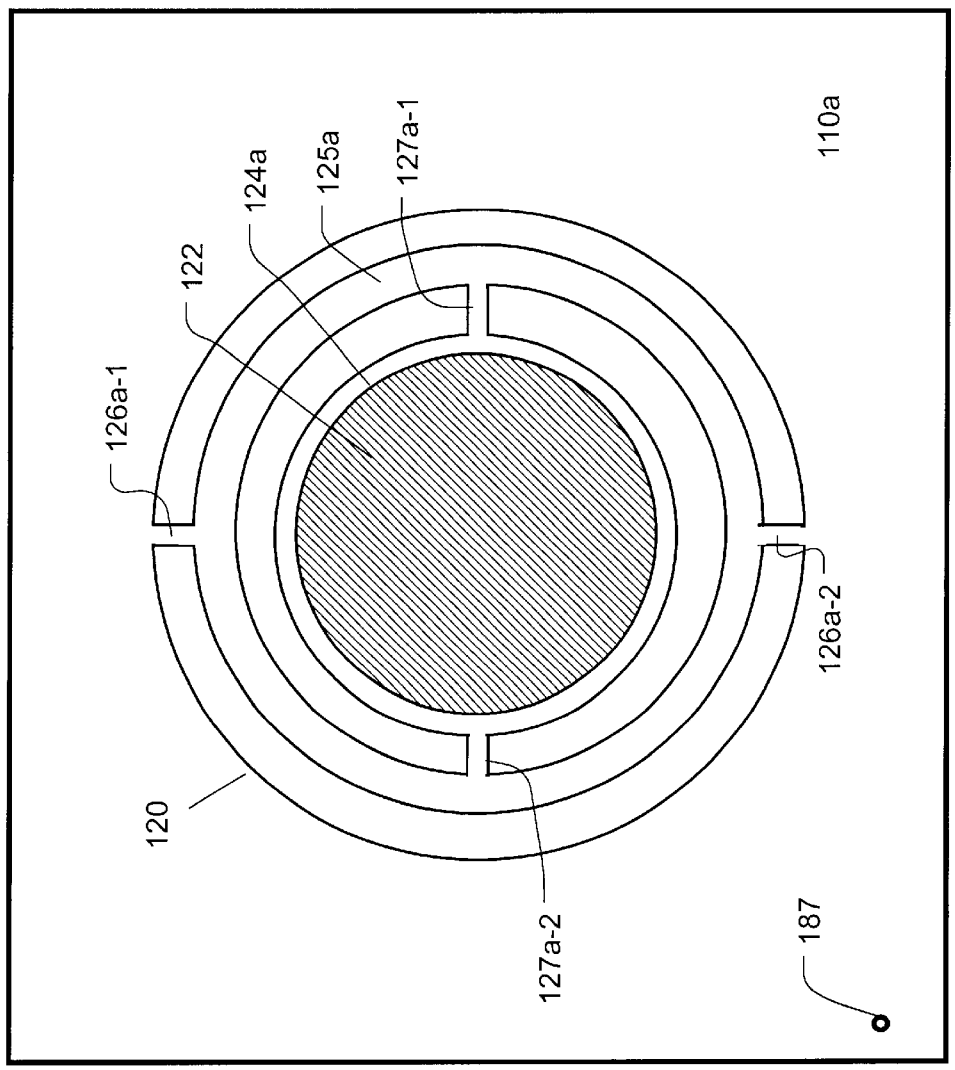
FIG. 9 illustrates an exemplary embodiment illustrating the connection of a bias to the mirror through a conductively doped single crystalline silicon.

FIG. 9 shows a third embodiment of the present invention in which the mirror 122 is biased from the actuation substrate 110a through pivot arms 126a-1/126a-2/127a-1/127a-2, mounting arm 125a and mirror mount 124a because the actuation substrate 110a, pivot arms 126a/127a, mounting arm 125a and mirror mount 124a are comprised of a conductive material, such as conductively doped single crystalline silicon. FIG. 9 also shows a connection point 187 connecting to the conductively doped single crystalline silicon for biasing the mirror 122.

It will be apparent to those skilled in the art that various modifications and variations can be made in the optical switch of the present invention without departing from the spirit or scope of the invention. Thus, it is intended that the present invention covers the modifications and variations of this invention provided they come within the scope of the appended claims and their equivalents.

What is claimed is:

1. An optical switch comprising:

a substrate; and an array of actuation substrates positioned above the substrate, wherein at least one of the actuation substrates includes a steerable mirror for reflecting an optical signal, wherein the steerable mirror is directly connected by an electrically conductive path to a potential bias having a magnitude greater than zero.

2. An optical switch comprising:

a substrate; and an array of actuation substrates positioned above the substrate, wherein at least one of the actuation substrates includes a steerable mirror for reflecting an optical signal, wherein the steerable mirror is connected by an electrically conductive path to a potential bias having a magnitude greater than zero, wherein the electrically conductive path is a wire.

3. The optical switch according to claim 1, wherein the mirror is connected to the potential bias through a mirror mount on which the mirror is mounted.

4. The optical switch according to claim 1, wherein the optical switching mechanism further includes an integrated control system for steering the mirror.

5. The optical switch according to claim 4, wherein the integrated control system includes electrodes positioned to steer the mirror.

6. The optical switch according to claim 5, wherein the integrated control system biases the electrodes with potentials to steer the mirror.

7. The optical switch according to claim 6, wherein a polarity of the potential bias connected to the mirror is negative.

8. The optical switch according to claim 6, wherein a polarity of the potential bias connected to the mirror is positive.

9. The optical switch according to claim 1, wherein a polarity of the potential bias connected to the mirror is positive.

10. The optical switch according to claim 1, wherein a polarity of the potential bias connected to the mirror is negative.

11. The optical switch according to claim 1, wherein the steerable mirror has a movement mechanism comprised of at least two sets of dual pivot points to form a single gimbal movement mechanism.

12. The optical switch according to claim 1, wherein the mirror is a microelectromechanical mirror.

13. A method of switching optical signals, comprising the acts of:

receiving an optical signal; and using a steerable mirror to output the received optical signal from the optical switch, wherein the steerable mirror is directly connected by an electrically conductive path to a potential bias having a magnitude greater than zero.

14. The method of optically switching optical signals according to claim 13, wherein the mirror is a microelectromechanical mirror.

15. The method of optically switching optical signals according to claim 13, wherein the optical switching mechanism further includes an integrated control system for steering the mirror with electrodes positioned to steer the mirror.

16. An optical switch comprising:

a substrate;

an array of actuation substrates positioned above the substrate;

each of the actuation substrates including a steerable mirror for reflecting an optical signal, wherein the steerable mirror is directly connected by an electrically conductive path to a potential bias having a magnitude greater than zero; and trench isolation between the actuation substrates.

17. The optical switch according to claim 16, wherein the mirror is connected to the potential bias through a wire.

18. The optical switch according to claim 16, wherein the mirror is connected to the potential bias through a mirror mount on which the mirror is mounted.

19. The optical switch according to claim 16, wherein the substrate includes electrodes and an integrated control system for steering the mirror.

20. The optical switch according to claim 16, wherein the mirror is a microelectromechanical mirror.

21. The optical switch according to claim 1, wherein the at least one actuation substrate includes at least one arm coupled to the steerable mirror to permit tilting thereof.

22. The optical switch according to claim 21, wherein the steerable mirror includes a reflective surface and a mirror substrate on which the reflective surface is mounted.

23. The optical switch according to claim 22, wherein the reflective surface is connected by the electrically conductive path to the potential bias.

* * * * *